(12) United States Patent
Fujimoto et al.

(10) Patent No.: US 6,485,053 B2
(45) Date of Patent: Nov. 26, 2002

(54) HYBRID INFLATOR IMPROVED IN MOUNTABILITY TO A MODULE

(75) Inventors: Osamu Fujimoto, Toyota (JP); Yuzo Goto, Himeji (JP); Satoshi Yagi, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/323,226

(22) Filed: Jun. 1, 1999

(65) Prior Publication Data

US 2002/0053789 A1 May 9, 2002

(30) Foreign Application Priority Data

Jun. 1, 1998 (JP) ............................................. 10-151198

(51) Int. Cl.⁷ .............................................. B60R 21/26
(52) U.S. Cl. ...................................... 280/741; 280/737
(58) Field of Search ................................ 280/741, 731, 280/736, 737, 728.2; 102/531, 530

(56) References Cited

U.S. PATENT DOCUMENTS

| | | | | |
|---|---|---|---|---|
| 5,016,914 A | * | 5/1991 | Faigle et al. | 280/741 |
| 5,360,232 A | * | 11/1994 | Lowe et al. | 280/741 |
| 5,409,526 A | * | 4/1995 | Gordon et al. | 280/731 |
| 5,415,845 A | * | 5/1995 | Brede et al. | 280/736 |
| 5,589,141 A | * | 12/1996 | Sides et al. | 280/741 |
| 5,660,412 A | * | 8/1997 | Renfroe et al. | 280/737 |
| 5,762,360 A | * | 6/1998 | Damman et al. | 280/728.2 |
| 5,762,364 A | * | 6/1998 | Cuevas | 280/731 |
| 5,913,537 A | * | 6/1999 | Goetz | 280/741 |
| 5,964,479 A | * | 10/1999 | Rink et al. | 280/741 |

FOREIGN PATENT DOCUMENTS

JP 8282427 A 10/1996

* cited by examiner

*Primary Examiner*—Brian L. Johnson
*Assistant Examiner*—Hau Phan
(74) *Attorney, Agent, or Firm*—Birch, Stewart, Kolasch & Birch, LLP

(57) ABSTRACT

A hybrid inflator having a structure permitting easy and reliable mounting to an airbag module, facilitating welding during manufacture, and improving in gas sealability and reduced in weight, is provided. The hybrid inflator is for use in an inflation type safety system for a motor vehicle equipped with an airbag, and includes an inflator housing, pressurized gas contained at least in the inflator housing, a gas generator housing connected to the inflator housing and provided with at least one gas generator outlet, a gas generating agent contained in the gas generator housing and ignited by an initiator, and an inflator operation assembly containing the initiator for operating the inflator. The inflator operation assembly comprises a boss welded to an end portion of the inflator housing to hermetically seal the housing, and the boss has an edge of flange shape to be mounted to an airbag module.

13 Claims, 5 Drawing Sheets

HYBRID INFLATOR IMPROVED IN MOUNTABILITY TO A MODULE

FIELD OF THE INVENTION

The present invention relates to an inflation type safety system for motor vehicles, and more particularly, to a hybrid inflator capable of quickly inflating an airbag.

BACKGROUND OF INVENTION

In recent years, with development of inflator for use in an inflation type safety system for motor vehicles, hybrid inflator which utilizes pressurized gas and solid gas generating agent in combination is attracting attention. A primary requirement for the design of such hybrid inflator is to inflate the airbag by a given amount in a given time to make the airbag operate effectively, and various structures therefor have been proposed hitherto (see Unexamined JP-A No. 8-282427, for example). Since the hybrid inflator is applied to a motor vehicle, the weight of the motor vehicle constitutes an important design requirement, so that the weight and dimensions of the inflator are important factors in the design. Also, there is a demand for inflators that can be manufactured easily, can be easily and reliably mounted to motor vehicles, can be easily filled with gas, and free of gas leak.

SUMMARY OF THE INVENTION

The present invention was created to fulfill the above requirements, and an object thereof is to provide a hybrid inflator which has a structure permitting the inflator to be easily and reliably mounted to an airbag module, compared to conventional inflators, easily welded during the manufacture, and improved in gas sealability and reduced in weight.

The present invention provides a hybrid inflator for an inflation type safety system for a motor vehicle equipped with an airbag, comprising an inflator housing, pressurized gas contained in the inflator housing, a gas generator housing connected to the inflator housing and provided with at least one gas generator outlet, a solid gas generating agent contained in the gas generator housing, and an initiator adapter for igniting the gas generating agent to produce propellant gas, wherein the hybrid inflator is characterized in that the adapter comprises a boss welded to an edge portion of the inflator housing, and that an outer end portion of the boss has a flange shape for mounting an airbag module. The outer surface of the flange portion of the boss is formed as a planar surface and a pressurized gas charging hole is bored so as to extend from the surface to the interior of the inflator housing. The charging hole is sealed by a pin inserted therein as a sealing member after the gas is charged.

The present invention also provides an airbag device production method applied to a hybrid inflator for an inflation type safety system for a motor vehicle equipped with an airbag, the hybrid inflator comprising an inflator housing, pressurized gas contained at least in the inflator housing, a gas generator housing connected to the inflator housing and provided with at least one gas generator outlet, a gas generating agent contained in the gas generator housing and ignited by an initiator, and an inflator operation assembly containing the initiator for operating the inflator, wherein the method is characterized in that the inflator operation assembly comprises a boss welded to an end portion of the inflator housing to hermetically seal the housing, an edge of the boss having a flange shape, and the hybrid inflator being mounted to a module via the flange of the boss.

DESCRIPTION OF PREFERRED EMBODIMENTS

The present invention will be hereinafter described in detail with reference to the drawings illustrating an embodiment thereof.

Figure 1:
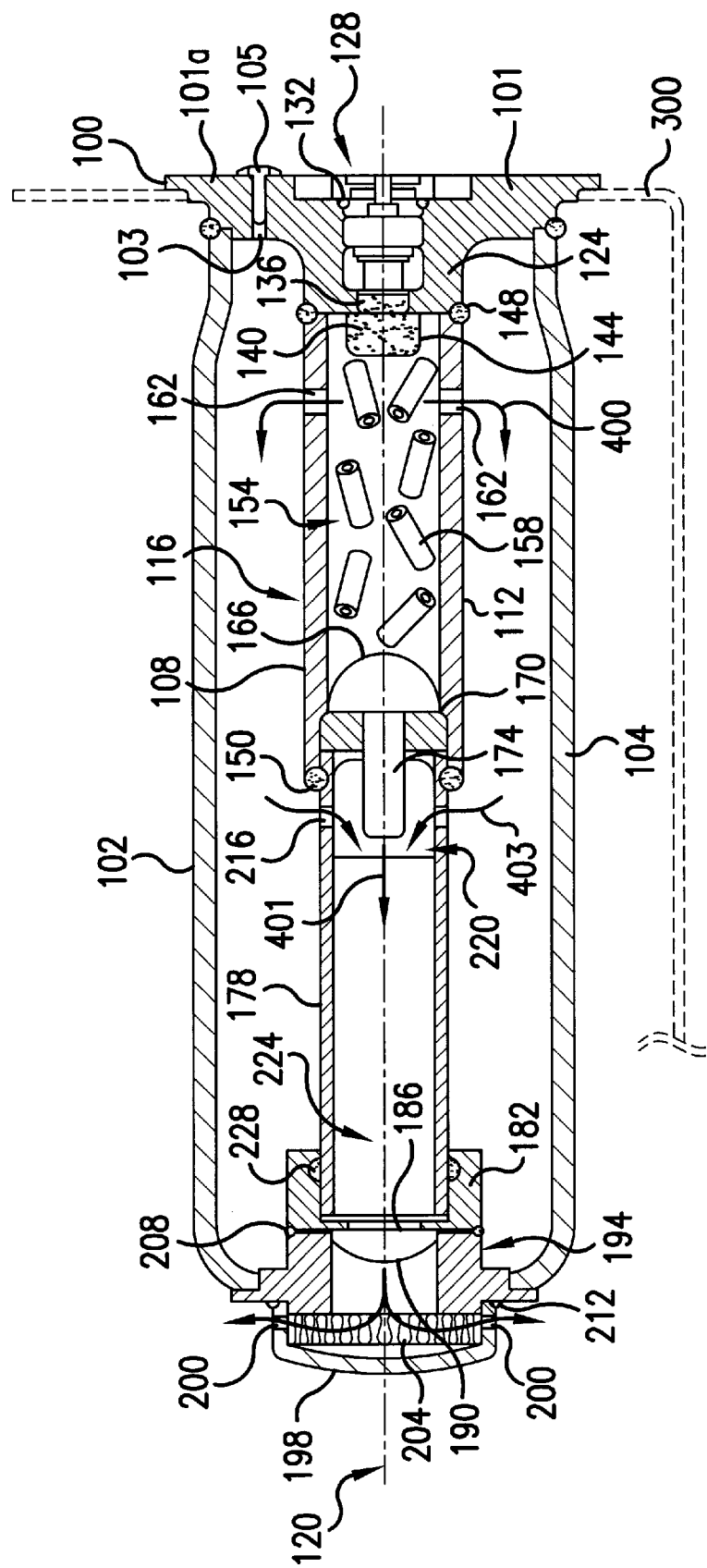
FIG. 1 is a longitudinal sectional view of a hybrid inflator according to one embodiment of the present invention.

FIG. 1 is a longitudinal sectional view of a hybrid inflator according to one embodiment of the present invention.

As shown in FIG. 1, a hybrid inflator 102 has a cylindrical gas generator 108 and a cylindrical inflator housing, that is, a high-pressure gas housing 104. The high-pressure gas housing 104 surrounds the gas generator 108 and is arranged coaxially therewith to have a common center axis 120. The high-pressure gas housing 104 contains a suitable gas under pressure, and the gas generator 108 contains grains 158 of a suitable gas generating agent.

The gas generator 108 has a cylindrical gas generator housing 112 comprising a first housing 116 and a second housing 178 axially coupled thereto. The first housing 116 has one end thereof coupled to an initiator adapter 124, for example, by welding at a weld 148 for hermetic sealing. The initiator adapter 124 includes a suitable initiator 128 (e.g., an electric igniter tube) which is used to ignite the grains 158 of the gas generating agent. In order to separate the initiator 128 from the gas under pressure contained in the gas generator 108, a secondary closing disk 136 is fixed between the end of the first housing 116 and a corresponding end of the initiator adapter 124, to form a hermetic seal in cooperation with the weld 148.

The first housing 116 of the gas generator housing 112 defines a first chamber 154 therein. The first chamber 154 adjoins the initiator 128 and is axially aligned therewith. The first chamber 154 of the gas generator housing 112 mainly contains therein the grains 158 of gas generating agent which, when ignited, produce a propellant gas that augments the gas flow toward an airbag. The first chamber 154 can thus be characterized as a propellant chamber or a combustion chamber. A suitable igniting agent 140 for assisting the ignition of the propellant grains 158 may be arranged between the initiator 128 and the propellant grains 158 at a location corresponding to the discharge from the initiator. Gas product formed by the ignition of the igniting agent 140 can chemically react with the pressurized gas to further enhance the characteristic of initiation of flow by means of rapid pressurization of the inflator 102. A suitable booster cup 144 contains therein the igniting agent 140 (generally, in the form of powder or obtained by drying slurry) and is fixed to at least one end of the initiator adapter 124 (e.g., held between the adapter 124 and the housing 116 via the weld 148). The first chamber 154 may include a screen 166 or a like member so that while the propellant gas is discharged toward a second chamber 224 in the second housing 178, granular matter of specified size may be retained therein.

The high-pressure gas housing 104 of the inflator 102 has a volume greater than that of the second chamber 224.

The first chamber 154 communicates with the high-pressure gas housing 104 through at least one bleed orifice (bleed hole) 162. In the figure, two bleed holes are formed. Consequently, in a static state, the first chamber 154 contains a large amount of gas under pressure. The bleed holes 162 extend in a radius direction, that is, they have a starting point thereof located on the center axis 120 and extend along a radius extending in a direction perpendicular to the center axis 120. The size and/or number of the bleed holes 162 may be selected to correctly adjust the performance of the inflator 102.

Since at least one bleed hole 162 is formed, a specified amount of the propellant gas flow, created due to the ignition of the propellant grains 158, is guided into the high-pressure gas housing 104 as a gas flow 400 shown in FIG. 1. Where the propellant of the aforementioned type (e.g., gun type propellant, hybrid propellant) and pressurized gas (e.g., mixture of oxygen and inert gas) are used, second combustion, that is, additional combustion of the propellant gas takes place in the high-pressure gas housing. Generally, an amount smaller than half the propellant gas produced to attain desired results (e.g., about 40% or less, more generally, about 30% or less of the propellant gas) flows into the high-pressure gas housing 104 during operation.

A main flow of the propellant gas produced in the first chamber 154 (e.g., at least about 50%, more generally, at least about 70% of the total flow of the propellant gas) is guided, as a gas flow 401 shown in FIG. 1, into the second chamber 224 (afterburner chamber) defined by the second housing 178 of the gas generator housing 112. At least one afterburner nozzle or aspirator 174 (first communication hole) guides the gas flow 401 (chiefly the propellant gas) from the first chamber 154 into the second chamber 224, whereby a desired communication is established. The afterburner nozzle 174 is engaged with a shoulder 170 formed in the inside of the first housing 116 to be situated inward of the first housing 116 before the first housing 116 is suitably connected to the second housing 178 (e.g., by welding connection at a weld 150).

The second housing 178 of the gas generator housing 112 has one end thereof engaged with an inner surface of an afterburner adapter 182 having at least one gas generator outlet 186 formed therein. An O-ring 228 is interposed between the second housing 178 and the adapter 182 to provide suitable sealing. The afterburner adapter 182 is suitably fixed to a boss 194, for example, by welding at a weld 208, and the boss 194 is fixed to the high-pressure gas housing 104, for example, by welding at a weld 212. These members are fixed together to provide hermetic sealing because in the static state the second chamber 224 contains a large amount of gas under pressure. To keep the gas under pressure appropriately within the inflator 102 until necessity arises, a main closing disk 190 is arranged between the end of the afterburner adapter 182 and the boss 194 and is retained by the weld 208.

Owing to the communication between the first chamber 154 and the second chamber 224, at least part of the propellant gas produced by the combustion of the propellant grains 158 and of the gas produced by the combustion of the igniting agent 140 is guided into the second chamber (afterburner chamber) 224. A rapid increase of pressure in the second chamber 224, which is controlled by a method described in detail later, opens the main closing disk 190 at a suitable time, so that the gas flow from the inflator 102 is guided to a diffuser 198 and then into an airbag (not shown). The diffuser 198 has a plurality of diffuser ports 200 to provide output to the airbag. In order to keep specified granular matter within the inflator 102 and to attain at least one of mixing and further accelerated reaction of the propellant gas with the pressurized gas before these gases move to the airbag, the diffuser 198 may include a diffuser screen 204.

The second chamber 224 further communicates with the high-pressure gas housing 104. At least one, preferably, a plurality of gas generator inlets 216 establish communication between the high-pressure gas housing 104 and the second chamber 224. Consequently, the pressurized gas in the high-pressure gas housing 104 can flow, as a gas flow 403 shown in FIG. 1, into the second chamber 224 at a suitable time. Namely, the direction of this specified gas flow can be controlled. Specifically, a valve 220 may be arranged adjacent to at least one, preferably, all of the gas generator inlets 216. In the static state, the valve 220 in this region need not actually separate the high-pressure gas housing 104 from the second chamber 224. In fact, a large amount of pressurized gas should preferably be kept within the second chamber 224 in the static state, and this permits the use of connection not associated with sealing. As one structure of the valve 220 not separating the second chamber 224 from the high-pressure gas housing on the gas generator inlets 216, a metallic insert material comprising a substantially cylindrical roll may be used. Cantilever connection may be employed between the valve 220 and the inner wall of the second housing 178. In this case, a rear portion (i.e., portion sufficiently spaced from the inlet 216) of the valve 220 is connected to the second housing 178, while front and intermediate portions of the valve 220 are not connected. As a result, the valve 220 is freely displaceable or deflectable.

From the above, it will be understood that in the static state the pressure prevailing in the interiors of the high-pressure gas housing 104 and the gas generator housing 112 is substantially uniform. However, in a dynamic state, that is, after the ignition of the propellant grains 158, the pressures in the respective chambers of the inflator 102 differ from each other to attain desired performance. When the propellant grains 158 are ignited, the propellant gas produced starts to flow into at least the second chamber 224 to increase the pressure therein. Since the inflator 102 has at least one bleed hole 162, part of the propellant gas flows into the high-pressure gas housing 104 and brings about a slight increase of the pressure in the high-pressure gas housing. The rate of increase in the pressure within the second chamber 224 is preferably higher than that within the high-pressure gas housing 104. The difference of pressure increase rate is produced because the propellant gas flows into each of the second chamber 224 and the high-pressure gas housing 104 and due to their relative volume difference. Because of this pressure difference, the valve 220 is pressed against the gas generator housing 112, or more specifically, against the inner wall of that portion of the second housing 178 which corresponds to the valve 220. As a result, the gas generator inlets 216 are shut off by the valve 220, so that the high-pressure gas housing 104 is separated from the second chamber 224. The aforementioned cantilever connection of the valve 220 permits displacement of the valve 220. When the pressure in the second chamber 224 has reached a predetermined pressure value, the fluid pressure directly acting upon the main closing disk 190 opens, breaks, or destroys the disk 190. Consequently, the disk 190 opens, creating a gas flow from the gas generator 108 to the diffuser 198 and the airbag.

After the main closing disk 190 opens to produce the gas flow to the airbag, the valve 220 maintains its position and thereby keeps shutting off the gas generator inlets 216 for a specified time. However, when a specified pressure difference is created between the high-pressure gas housing 104 and the second chamber 224, the valve 220 is displaced by an urging force induced by the pressure difference, to open the gas generator inlets 216. Where the valve 220 is formed in the manner described above, the free end of the valve 220 is displaced radially inward toward the center axis 120 or the valve is depressed in regions radially corresponding to at least the gas generator inlets 216, thereby admitting desired gas flows through the gas generator inlets 216. The valve 220 is, however, retained since it is connected to the second housing 178. When the gas generator inlets 216 are opened, the gas starts to flow from the high-pressure gas housing 104 into the second chamber 224. The valve 220 is movable from its first to second position. Namely, the valve 220 is, when in use, situated at the first position and substantially blocks the aforesaid flow. When the pressure in the high-pressure gas housing 104 has exceeded the pressure in the gas generator housing 112 by a predetermined amount, the valve 220 moves to the second position to admit the flow, the second position being located more radially inward than the first position.

In this embodiment, the initiator 128 is fitted in the initiator adapter 124 as mentioned above, and an outer periphery thereof can be brought to engagement along the inner periphery of an O-ring 132 for providing suitable sealing. The secondary closing disk 136 is provided to separate the initiator 128 from the pressurized gas contained in the gas generator 108.

When a suitable signal indicative of the need to expand the airbag is detected by a detector (sensor), the initiator 128 is activated. Activation of the initiator 128 ruptures the secondary closing disk 136 and ignites the igniting agent (booster agent) 140, which in turn ignites the propellant grains 158, and the combustion of the propellant grains 158 produces propellant gas within the first chamber 154, then activates the inflator 102 as mentioned above to break the main closing disk 190, so that the gas flow delivers required gas to the airbag through the diffuser ports 200 of the diffuser 198 as indicated by the arrow in FIG. 1.

According to the present invention, the aforementioned initiator adapter 124 is formed of a boss 101 having a flange 100 and an end face of planer shape. The flange 100 facilitates the mounting of the inflator 102 to an airbag module 300. A pressurized gas charging hole 103 is formed in a planar end face 101a of the boss 101, and a seal pin 105 is inserted into the charging hole 103 and welded thereto after the gas is charged. With this structure, the pin can be reliably inserted into the charging hole before the gas charging, whereby gas leak is prevented from being caused due to displacement.

Figure 2:
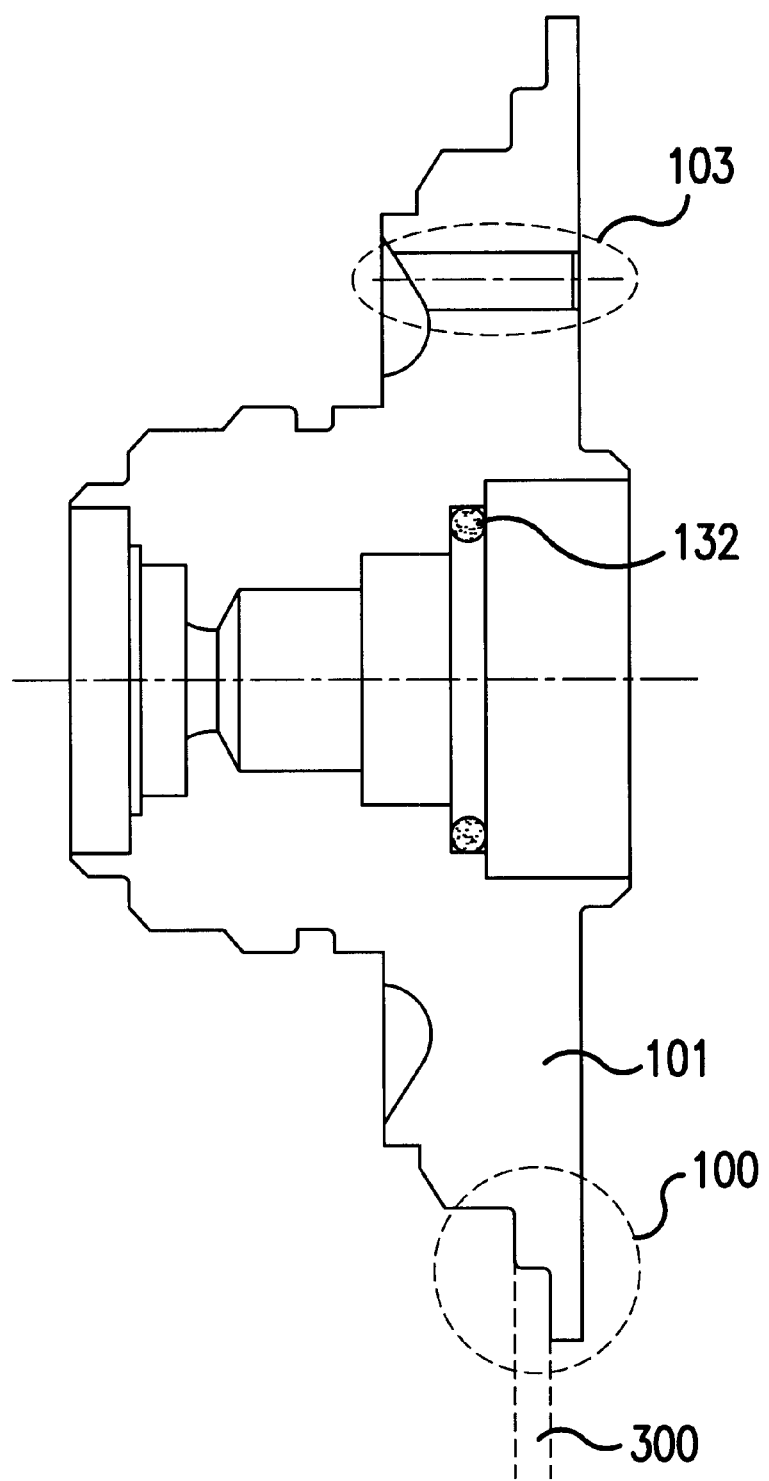
FIG. 2 is an enlarged longitudinal sectional view of a boss of the hybrid inflator according to the present invention.

FIG. 2 is an enlarged longitudinal sectional view of the initiator adapter 124. The flange 100 is attached to the airbag module 300, and since the airbag module has a whirl-stop and positioning mechanism and also the flange 100 is provided, the mountability improves. The gas charging hole 103 is provided with a planar gas seal, so that gas sealing is facilitated at the time of charging. Also, since welding is performed on a plane with the inflator 102 set upright, welding in the process is easy and welding reliability improves.

The boss 101 shown in FIG. 2 incorporates the O-ring 132 fitted in an insertion hole for the initiator 128, and after the O-ring 132 is incorporated in the boss 101, the initiator 128 is inserted. That is, there is a gap provided between the inner diameter of the O-ring and the outer diameter of the initiator to facilitate the insertion, and sealing is achieved by depressing the O-ring on the initiator flange surface. This lessens the possibility of the O-ring 132 being twisted and also facilitates automatic mounting.

Figure 3:
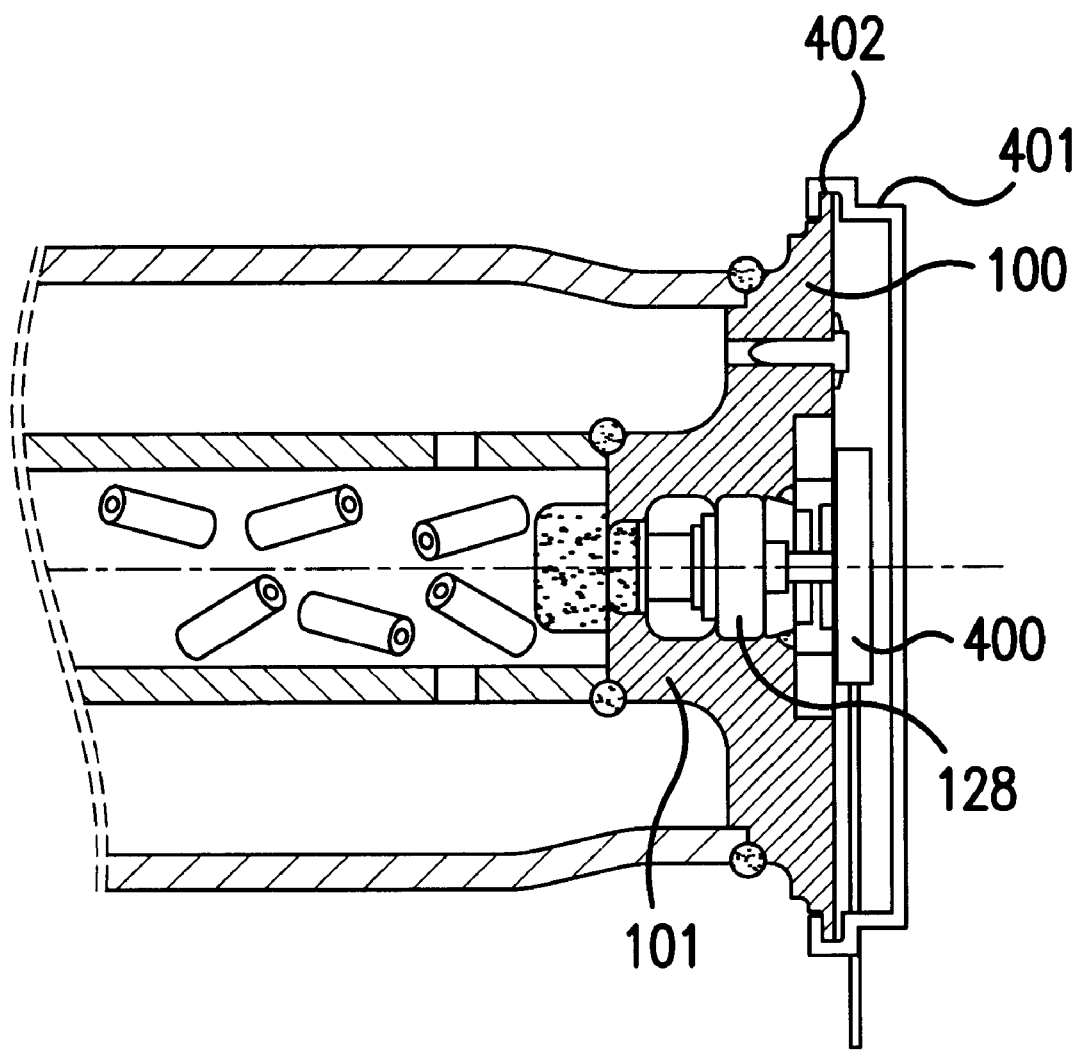
FIG. 3 is a longitudinal sectional view showing the boss with a connector and a connector cover attached thereto.
Figure 4:
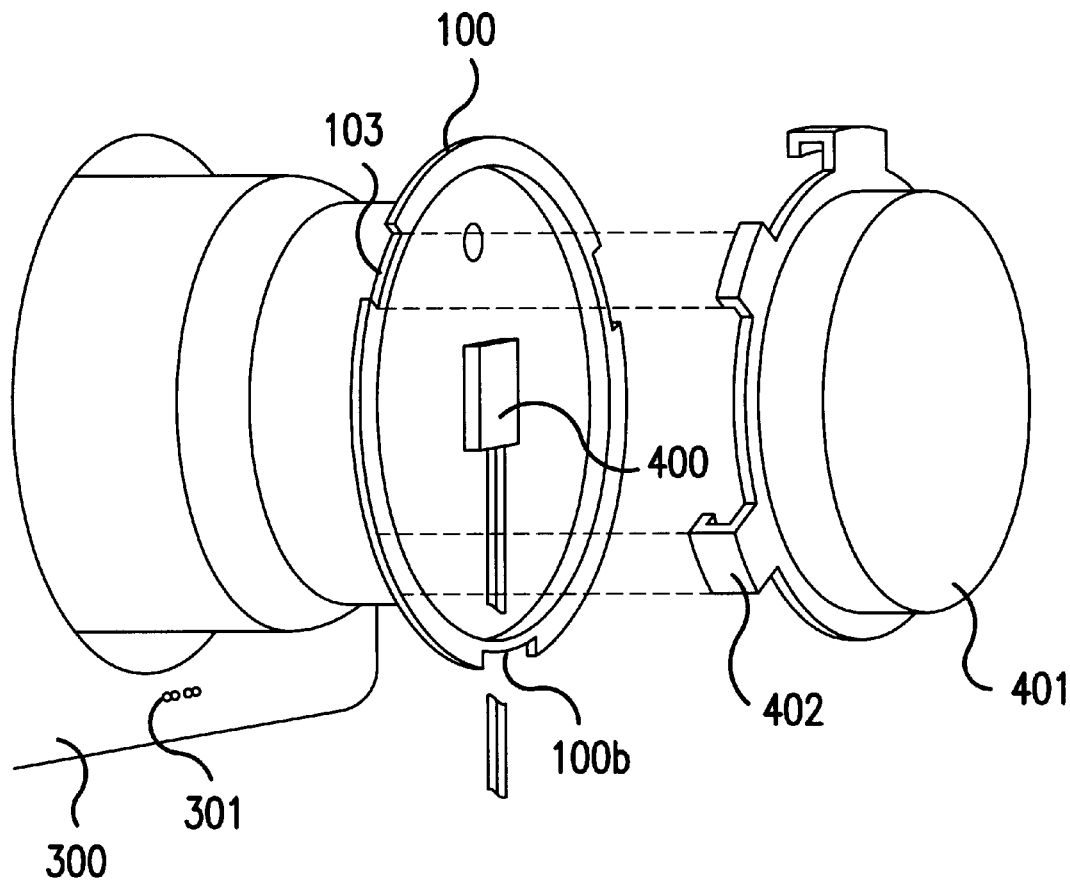
FIG. 4 is an exploded perspective view schematically illustrating how the connector and the connector cover are attached to the boss.
Figure 5:
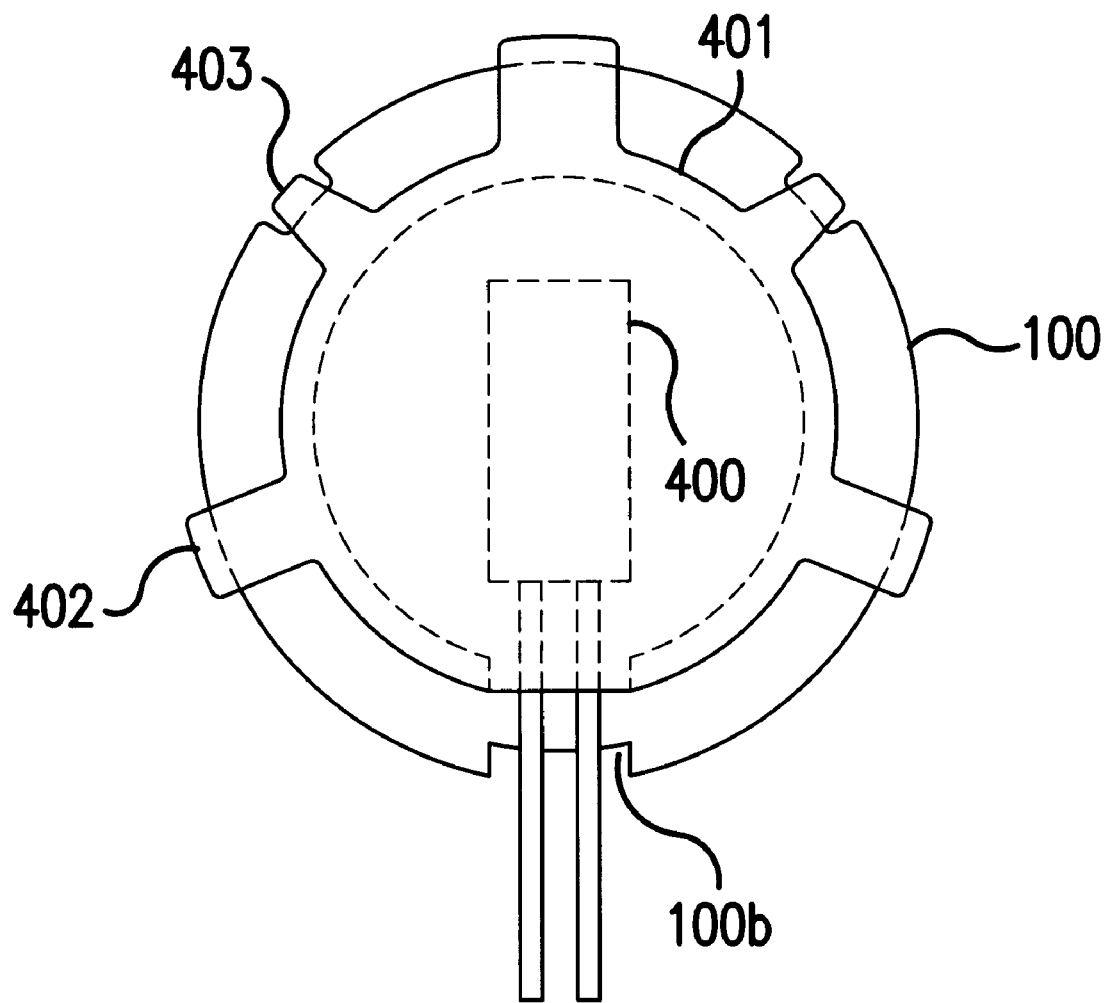
FIG. 5 is an end view showing the boss with the connector and the connector cover attached thereto.

Referring now to FIGS. 3 to 5, an embodiment constructed such that a connector protection cover is fitted on the flange of the boss 101 characterizing the inflator 102 of the present invention will be described.

In FIG. 3, a connector 400 is connected to the initiator 128, which is fitted in the initiator insertion hole of the boss 101 and fixed thereto by crimping, and a connector cover 401 is fitted over the connector 400. The connector cover 401 deforms to receive the flange of the boss 101 and has connector cover hooks 402 thereof that hook 100 onto the edge of the flange 100 for engaging therewith, as shown in FIG. 4, thus eliminating the need for separate members such as screws.

Also, the flange 100 has a notch 100b cut in part thereof and protuberances 301 are formed on a corresponding portion of the module case 300, so that they serve as positioning means for the inflator 102 when the inflator is fastened by nuts. The connector cover 401 is mounted on the end flange 100 of the boss 101 of the inflator 102, as shown in FIG. 5, wherein 402 denotes connector cover hooks and 403 denotes a connector cover whirl-stop fitted in a groove 103 of the flange 100.

The connector cover described above prevents the connector section from touching the mounting section when the inflator is mounted on a vehicle, and thus resulting contact failure or conduction failure can be eliminated. Also, since dust can be kept from the vicinities of the connector for a long period of time, conduction failure does not occur.

When the inflator is mounted to the module case and fastened thereto by nuts, the notch cut in part of the flange and the protuberances formed on the corresponding portion of the module case engage with each other, so that the inflator does not rotate but can be fixed in a predetermined oriented position.

What is claimed is:

1. A hybrid inflator for an inflation type safety system for a motor vehicle equipped with an airbag, comprising:
    an inflator housing adapted to contain pressurized gas therein and having an opening at one end portion thereof;
    a gas generator housing connected to said inflator housing and provided with at least one gas generator outlet, said gas generator housing adapted to contain a gas generator agent therein; and
    a boss made of a single piece material and welded to said opening of said inflator housing to hermetically seal said opening, said boss having,
        a flange portion for mounting said inflator housing onto an airbag module by engaging the flange portion to the airbag module,
        a first engaging portion formed in said flange portion for preventing a connector cover from rotating with respect to said boss by engaging with the connector cover, said first engaging portion being a recess defined only by three hems formed in the flange portion, and
        a second engaging portion, provided independently from said first engaging portion, formed in said flange portion for preventing the connector cover from detaching from said boss by engaging with the connector cover.

2. The hybrid inflator according to claim 1, wherein at least a portion of an outer end face of the flange portion has a planar portion, the planar portion having a gas charging hole for charging gas into the inflating housing.

3. The hybrid inflator according to claim 2, wherein said gas charging hole is sealed by a pin inserted into the gas charging hole.

4. The hybrid inflator according to claim 3, wherein said pin is welded to said boss after inserted into the gas charging hole.

5. The hybrid inflator according to claim 1,
wherein the flange portion is provided with a positioning member adapted to mount the inflator to the airbag module.

6. The hybrid inflator according to claim 5, wherein the positioning member includes a notch cut in part of the flange for engaging a protuberance provided on the airbag module.

7. The hybrid inflator according to claim 1, wherein the first engaging portion engages a third engaging portion provided on said connector cover.

8. The hybrid inflator according to claim 7, wherein the third engaging portion is a protrusion protruding from a periphery of said connector cover.

9. The hybrid inflator according to claim 1, wherein said inflator housing is mounted onto the airbag module by engaging the flange portion to the airbag module.

10. The hybrid inflator according to claim 1, wherein said boss includes an initiator adapter portion for receiving an initiator for igniting the gas generating agent.

11. The hybrid inflator according to claim 1, wherein said second engaging portion is a periphery of the flange portion, and said connector cover is provided with a protrusion that engages said flange portion.

12. A method of manufacturing a hybrid inflator for an inflation type safety system for a motor vehicle equipped with an airbag, comprising:
providing an inflator housing adapted to contain pressurized gas therein and having an opening at one end portion thereof;
providing a gas generator housing connected to said inflator housing and provided with at least one gas generator outlet, said gas generator housing adapted to contain a gas generator agent therein; and
providing a boss made of a single piece material and welded to said opening of said inflator housing to hermetically seal said opening;
providing said boss with a flange portion for mounting said inflator onto an airbag module by engaging the flange portion to the airbag module;
providing said boss with a first engaging portion formed in said flange portion for preventing a connector cover from rotating with respect to said boss by engaging with the connector cover, said first engaging portion being a recess defined only by three hems formed in the flange portion; and
providing said boss with a second engaging portion, provided independently from said first engaging portion, formed in said flange portion for preventing the connector cover from detaching from said boss by engaging with the connector cover.

13. A hybrid inflator for an inflation type safety system for a motor vehicle equipped with an airbag, comprising:
an inflator housing adapted to contain pressurized gas therein and having an opening at one end portion thereof;
a gas generator housing connected to said inflator housing and provided with at least one gas generator outlet, said gas generator housing adapted to contain, therein, a gas generator agent ignited by an initiator;
a boss made of a single piece material and welded to the opening of said inflator housing to hermetically seal said opening, said boss having an initiator adapter portion for receiving the initiator therein; and
a connector cover adapted to be attached to the flange portion of said boss to cover an entire portion of a connector connected to the initiator,
wherein said boss includes,
a flange portion for mounting said inflator housing onto an airbag module by engaging the flange portion to the airbag module,
a first engaging portion formed in said flange portion for preventing said connector cover from rotating with respect to said boss by engaging with the connector cover, said first engaging portion being a recess defined only by three hems formed in the flange portion, and
a second engaging portion, provided independently from said first engaging portion, formed in said flange portion for preventing said connector cover from detaching from said boss by engaging with the connector cover.

\* \* \* \* \*